(12) United States Patent
Bybee et al.

(10) Patent No.: US 11,808,885 B2
(45) Date of Patent: Nov. 7, 2023

(54) LOCALIZATION SYSTEM FOR AUTONOMOUS VEHICLES USING SPARSE RADAR DATA

(71) Applicant: Autonomous Solutions, Inc., Mendon, UT (US)

(72) Inventors: Taylor Bybee, Mendon, UT (US); Jeffrey Ferrin, Mendon, UT (US); Gary Ellingson, Mendon, UT (US)

(73) Assignee: AUTONOMOUS SOLUTIONS, INC., Mendon, UT (US)

( * ) Notice: Subject to any disclaimer, the term of this patent is extended or adjusted under 35 U.S.C. 154(b) by 52 days.

(21) Appl. No.: 17/592,407

(22) Filed: Feb. 3, 2022

(65) Prior Publication Data

US 2022/0244351 A1   Aug. 4, 2022

Related U.S. Application Data

(63) Continuation of application No. 63/145,467, filed on Feb. 3, 2021.

(51) Int. Cl.
| | |
|---|---|
| *G01S 7/41* | (2006.01) |
| *G01C 21/30* | (2006.01) |
| *G01S 13/00* | (2006.01) |
| *G01S 13/86* | (2006.01) |
| *B60W 60/00* | (2020.01) |

(52) U.S. Cl.
CPC .............. *G01S 7/412* (2013.01); *G01C 21/30* (2013.01); *G01S 13/00* (2013.01); *G01S 13/86* (2013.01); *B60W 60/001* (2020.02); *B60W 2420/42* (2013.01); *B60W 2420/52* (2013.01); *B60W 2520/10* (2013.01); *B60W 2520/12* (2013.01); *B60W 2520/28* (2013.01); *B60W 2556/40* (2020.02); *B60W 2556/45* (2020.02)

(58) Field of Classification Search
CPC ......... G01C 21/30; G01S 7/412; G01S 13/89; B60W 60/001
See application file for complete search history.

(56) References Cited

U.S. PATENT DOCUMENTS

| | | | |
|---|---|---|---|
| 11,636,689 B2 * | 4/2023 | Jain ...................... | G06V 10/955 382/103 |
| 2003/0210175 A1 | 11/2003 | Bickert et al. | |

(Continued)

OTHER PUBLICATIONS

Danzer, A, et al., "2D Car Detection in Radar Data with PointNets", 2019 IEEE Intelligent Transportation Systems Conference (ITSC), p. 7, (Dec. 2, 2019).

(Continued)

*Primary Examiner* — Tan Q Nguyen

(57) ABSTRACT

An autonomous vehicle is disclosed that includes a velocity sensor; a radar system; a digital storage medium; and a controller in communication with the digital storage medium, radar system, and the velocity sensor. The controller, for example, may retrieve map data from the digital storage medium; receive current radar data from the radar system; receive autonomous vehicle velocity data from the velocity sensor; identify radar data points in the current radar data that represent objects in motion; remove radar data points from the current radar data that represent objects in motion; and/or match the radar data with the map data to return location data.

19 Claims, 4 Drawing Sheets

(56) References Cited

U.S. PATENT DOCUMENTS

| | | |
|---|---|---|
| 2003/0210181 A1 | 11/2003 | Hager et al. |
| 2007/0154066 A1 | 7/2007 | Lin et al. |
| 2010/0019963 A1 | 1/2010 | Gao et al. |
| 2012/0281907 A1 | 11/2012 | Samples et al. |
| 2013/0242284 A1 | 9/2013 | Zeng |
| 2014/0297093 A1 | 10/2014 | Murai et al. |
| 2015/0045992 A1 | 2/2015 | Ashby et al. |
| 2016/0187147 A1 | 6/2016 | Kang |
| 2016/0282879 A1 | 9/2016 | Ichikawa et al. |
| 2016/0363647 A1 | 12/2016 | Zeng et al. |
| 2017/0097410 A1 | 4/2017 | Liu et al. |
| 2017/0363731 A1 | 12/2017 | Bordes et al. |
| 2020/0209009 A1 | 7/2020 | Zhang et al. |
| 2021/0370968 A1* | 12/2021 | Xiao .................. G01S 17/86 |
| 2022/0327719 A1* | 10/2022 | Shaag ................ H04N 23/90 |
| 2022/0383749 A1* | 12/2022 | Ishikawa ............. B60W 40/04 |

OTHER PUBLICATIONS

International Search Report and Written Opinion in PCT Application No. PCT/US2022/015134 dated Jun. 8, 2022, 13 pages.

\* cited by examiner

LOCALIZATION SYSTEM FOR AUTONOMOUS VEHICLES USING SPARSE RADAR DATA

BACKGROUND

Localizing an autonomous vehicles is a necessary problem that can be complex and difficult to solve. The problem can be compounded when localization is required in areas without set or known infrastructure. Localization can also be challenging in areas where GPS is not available (GPS denied) and/or in adverse conditions such, for example, when the autonomous vehicle is operating in dust, fog, falling snow, falling rain, etc.

SUMMARY

Systems and methods for localizing an autonomous vehicle without GPS data are disclosed. Systems and methods are also disclosed for localizing an autonomous vehicle with sparse radar data.

A method is disclosed that may include receiving map data; receiving current radar data at an autonomous vehicle; receiving autonomous vehicle velocity data; identifying radar data points in the current radar data that represent objects in motion; removing radar data points from the current radar data that represent objects in motion; and matching the radar data with the map data to return location data.

The method may include, for example, combining the current radar data with previous radar data using the autonomous vehicle velocity data. The method may include, for example, filter erroneous radar data from the combined radar data.

The method may include, for example, estimating an estimated location of the autonomous vehicle based on previous radar data and vehicle velocity data; and comparing the location data with the previous estimated location.

The method may include, for example, estimating an estimated location of the autonomous vehicle based on previous radar data and vehicle velocity data comprises using a Kalman filter or any variant of a Kalman filter, or a particle filter or any variants of a particle filter.

The map data, for example, may include a point cloud.

The autonomous vehicle velocity data, for example, may include velocity data from a wheel encoder, inertial measurement unit data, vehicle acceleration data, wheel speed data, camera data, and/or ground speed radar data.

The matching the radar data with the map data to return location data, for example, may include using any point cloud-matching or grid-matching algorithm, including iterative closest point, cross-correlation, weight techniques, grid-to-radar scoring, and/or perfect match.

The matching the radar data with the map data to return location data, for example, may include performing a global search in the map data using the combined radar data.

An autonomous vehicle is disclosed that includes a velocity sensor; a radar system; a digital storage medium; and a controller in communication with the digital storage medium, radar system, and the velocity sensor. The controller, for example, may retrieve map data from the digital storage medium; receive current radar data from the radar system; receive autonomous vehicle velocity data from the velocity sensor; identify radar data points in the current radar data that represent objects in motion; remove radar data points from the current radar data that represent objects in motion; and/or match the radar data with the map data to return location data.

The various examples described in the summary and this document are provided not to limit or define the disclosure or the scope of the claims.

DETAILED DESCRIPTION

Systems and/or methods are disclosed for localizing an autonomous vehicle in a GPS-denied environment. These systems and/or methods, for example, may return the pose of the autonomous vehicle. The pose of an autonomous vehicle may include the position, orientation, and/or speed of the autonomous vehicle within a map. The map may include a map of a defined work area.

One or more radar sensors, for example, may be used as a localization sensor. Radar sensors, for example, can penetrate dust, fog, falling snow, and/or falling rain. This may allow the autonomous vehicle to be localized in environments and/or conditions where other localization techniques (e.g., traditional or lidar-based location) may fail. In addition, radars tend to be less expensive than other sensor and/or radars may have a longer detection range (e.g., greater than 260 m) than other sensors.

Some systems and/or methods may be used in environments with or without localization infrastructure (e.g., poles, barrels, retroreflectors, etc.). If there are enough other features in the environment, then the systems and/or methods disclosed in this document may be used without localization infrastructure. Regardless, localization infrastructure can be used by may not be needed and may include passive infrastructure such as, for example, poles or barrels.

System and/or methods are disclosed that may provide autonomous vehicle localization using radar data that is compared with a radar map. For example, system and/or methods are disclosed that may provide autonomous vehicle localization that removes objects in motion from radar data. For example, system and/or methods are disclosed that may provide autonomous vehicle localization using radar data that compensates for the motion of an autonomous vehicle using one or more of various velocity measurement techniques. For example, system and/or methods are disclosed that may compare autonomous vehicle radar localization data with estimated localization data.

For example, system and/or methods are disclosed that provide autonomous vehicle localization that matches radar data with map data. The map data, for example, may include a point cloud or an occupancy grid. The map data may, for example, may be created in part or in whole using GPS and/or SLAM-techniques.

Figure 1:
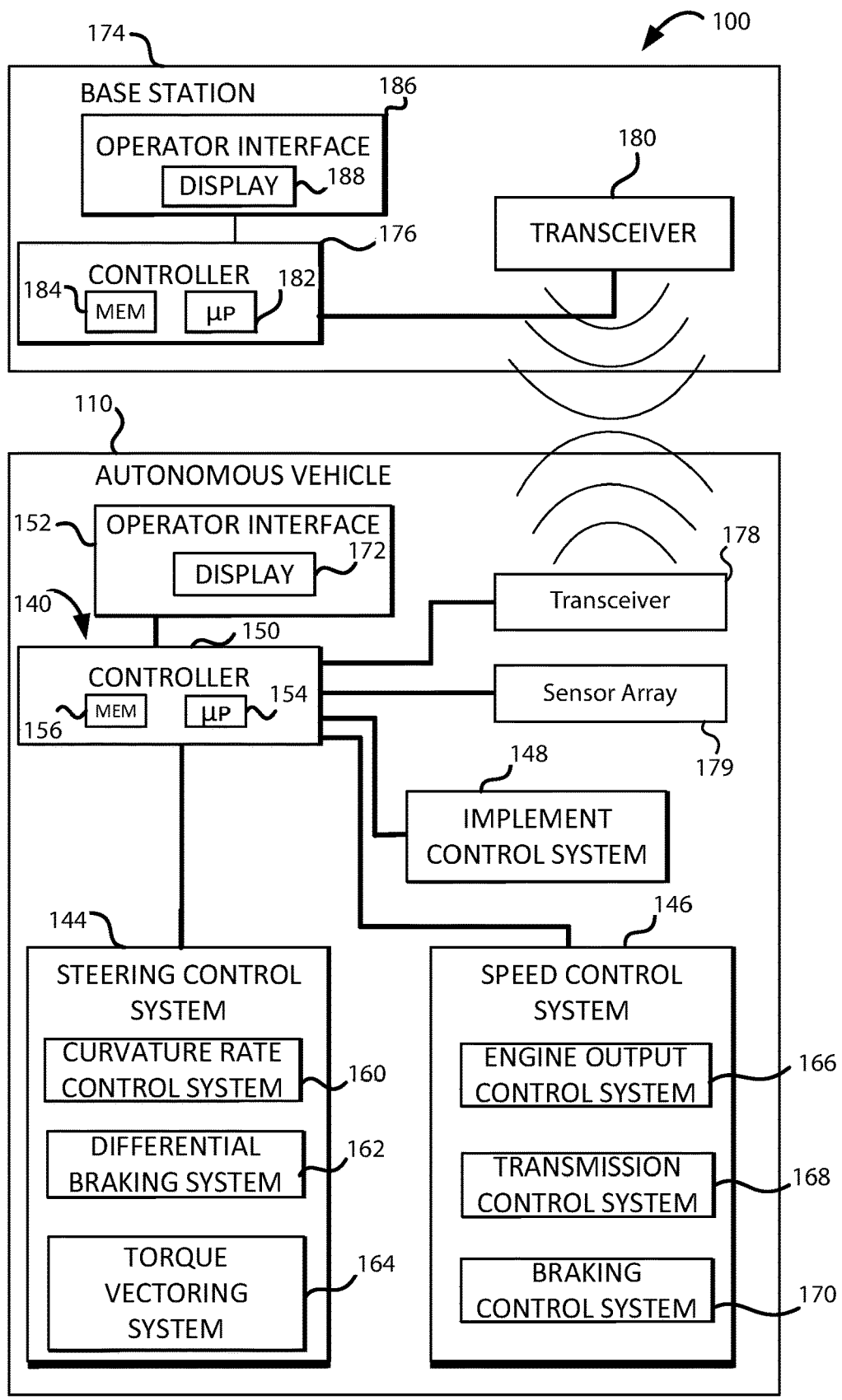
FIG. 1 illustrates a block diagram of an example autonomous vehicle communication system of the present disclosure.

FIG. 1 is a block diagram of a communication and control system 100 that may be utilized in conjunction with the systems and methods of the disclosure. The communication and control system 100 may include a vehicle control system 140 which may be mounted on an autonomous vehicle 110. The autonomous vehicle 110, for example, may include a loader, wheel loader, track loader, dump truck, digger, backhoe, forklift, etc. The communication and control system 100, for example, may include any or all components of computational unit 400 shown in FIG. 4.

For example, the autonomous vehicle 110 may include a steering control system 144 that may control a direction of movement of the autonomous vehicle 110. The steering control system 144, for example, may include any or all components of computational unit 400 shown in FIG. 4.

The autonomous vehicle 110, for example, may include a speed control system 146 that controls a speed of the autonomous vehicle 110. The speed control system 146, for example, may control the speed of the autonomous vehicle 110 based on map data, control algorithms, obstacle detection, start and/or stop points, etc.

The autonomous vehicle 110, for example, may include an implement control system 148 that may control operation of an implement towed by the autonomous vehicle 110 or integrated within the autonomous vehicle 110. The implement control system 148 may, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. The speed control system 146, for example, may include any or all components of computational unit 400 shown in FIG. 4.

The vehicle control system 140, for example, may include a controller 150 communicatively coupled to the steering control system 144, to the speed control system 146, and the implement control system 148. The controller 150 may include a vehicle control unit (VCU). The vehicle control system 140, for example, may be integrated into a single control system. The vehicle control system 140, for example, may include a plurality of distinct control systems. The vehicle control system 140, for example, may include any or all the components show in FIG. 4.

The controller 150, for example, may be used to control various aspects of the vehicle such as, for example, steering control system 144, implement control system 148, speed control system 146, etc. The VCU, for example, may include a vehicle artificial intelligence (VAI) that may include one or more processors that execute one or more algorithms.

The controller 150, for example, may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 150, for example, may be an electronic controller with electrical circuitry configured to process data from the various components of the autonomous vehicle 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors. The controller 150, for example, may include any or all the components show in FIG. 4.

The memory device 156, for example, may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous vehicle 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

The steering control system 144, for example, may include a curvature rate control system 160, a differential braking system 162, a steering mechanism, and a torque vectoring system 164 that may be used to steer the autonomous vehicle 110. The curvature rate control system 160, for example, may control a direction of an autonomous vehicle 110 by controlling a steering control system of the autonomous vehicle 110 with a curvature rate, such as an Ackerman style autonomous loader, 110 or articulating loader. The curvature rate control system 160, for example, may automatically rotate one or more wheels or tracks of the autonomous vehicle 110 via hydraulic or electric actuators to steer the autonomous vehicle 110. By way of example, the curvature rate control system 160 may rotate front wheels/tracks, rear wheels/tracks, and/or intermediate wheels/tracks of the autonomous vehicle 110 or articulate the frame of the loader, either individually or in groups. The differential braking system 162 may independently vary the braking force on each lateral side of the autonomous vehicle 110 to direct the autonomous vehicle 110. Similarly, the torque vectoring system 164 may differentially apply torque from the engine to the wheels and/or tracks on each lateral side of the autonomous vehicle 110. While the illustrated steering control system 144 includes the curvature rate control system 160, the differential braking system 162, and the torque vectoring system 164, the steering control system 144 may include one or more of these systems. Further examples may include a steering control system 144 having other and/or additional systems to facilitate turning the autonomous vehicle 110 such as an articulated steering control system, a differential drive system, and the like.

The speed control system 146, for example, may include an engine output control system 166, a transmission control system 168, and a braking control system 170. The engine output control system 166 may vary the output of the engine to control the speed of the autonomous vehicle 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous vehicle 110. Furthermore, the braking control system 170 may adjust braking force to control the speed of the autonomous vehicle 110. While the illustrated speed control system 146 includes the engine output control system 166, the transmission control system 168, and the braking control system 170, the speed control system 146 may include one or two of these systems. The speed control system 146, for example, may also include other systems and/or additional systems that may be used to control the speed of the autonomous vehicle 110.

The implement control system 148, for example, may control various parameters of the implement towed by and/or integrated within the autonomous vehicle 110. For example, the implement control system 148 may instruct an implement controller via a communication link, such as a CAN bus, ISOBUS, Ethernet, wireless communications, and/or Broad R Reach type Automotive Ethernet, etc.

The implement control system 148, for example, may instruct an implement controller to adjust a penetration depth of at least one ground engaging tool of an agricultural implement, which may reduce the draft load on the autonomous vehicle 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shovel position, etc.

The implement control system 148, as another example, may instruct the implement controller to adjust a shovel height, a shovel angle, a shovel position, etc.

The communication and control system 100, for example, may include a sensor array 179. The sensor array 179, for example, may facilitate determination of condition(s) of the autonomous vehicle 110 and/or the work area. For example, the sensor array 179 may include one or more sensors (e.g., infrared sensors, ultrasonic sensors, magnetic sensors, tachometer, radar sensors, Lidar sensors, terahertz sensors, sonar sensors, wheel encoders, cameras, etc.) that monitor a rotation rate of a respective wheel or track and/or a ground speed of the autonomous vehicle 110. The sensors may also monitor operating levels (e.g., temperature, fuel level, etc.) of the autonomous vehicle 110. Furthermore, the sensors may monitor conditions in and around the work area, such as temperature, weather, wind speed, compass, humidity, and other conditions. The sensors of the sensor array 179, for example, may detect physical objects in the work area, such as a parking stall, a material stall, accessories, other vehicles, obstacles, environmental features, or other object(s) that may in the area surrounding the autonomous vehicle 110.

The sensor array 179, for example, may include a velocity sensor which may include one or more of an inertial measurement unit, a compass, a GPS sensor, a wheel encoder, a tachometer, a camera, a radar, etc. The sensor array 179, for example, may also include a steering angle sensor. The velocity sensor, for example, may produce velocity data. Velocity data may include speed and/or bearing. Velocity data, for example, may also include steering angular rate.

The operator interface 152, for example, may be communicatively coupled to the controller 150 and configured to present data from the autonomous vehicle 110 via a display 172. Display data may include: data associated with operation of the autonomous vehicle 110, data associated with operation of an implement, a position of the autonomous vehicle 110, a speed of the autonomous vehicle 110, a desired path, a drivable path plan, a target position, a current position, etc. The operator interface 152 may enable an operator to control certain functions of the autonomous vehicle 110 such as starting and stopping the autonomous vehicle 110, inputting a desired path, etc. The operator interface 152, for example, may enable the operator to input parameters that cause the controller 150 to adjust the drivable path plan. For example, the operator may provide an input requesting that the desired path be acquired as quickly as possible, that an off-path normal error be minimized, that a speed of the autonomous vehicle 110 remain within certain limits, that a lateral acceleration experienced by the autonomous vehicle 110 remain within certain limits, etc. In addition, the operator interface 152 (e.g., via the display 172, or via an audio system (not shown), etc.) may alert an operator if the desired path cannot be achieved, for example.

The vehicle control system 140, for example, may include a base station 174 having a base station controller 176 located remotely from the autonomous vehicle 110. For example, the control functions of the vehicle control system 140 may be distributed between the controller 150 of the autonomous loader vehicle control system 140 and the base station controller 176. The base station controller 176, for example, may perform a substantial portion of the control functions of the vehicle control system 140. For example, a first transceiver 178 positioned on the autonomous vehicle 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. The base station controller 176, for example, may calculate drivable path plans and/or output control signals to control the curvature rate control system 160, the speed control system 146, and/or the implement control system 148 to direct the autonomous vehicle 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

Figure 2:
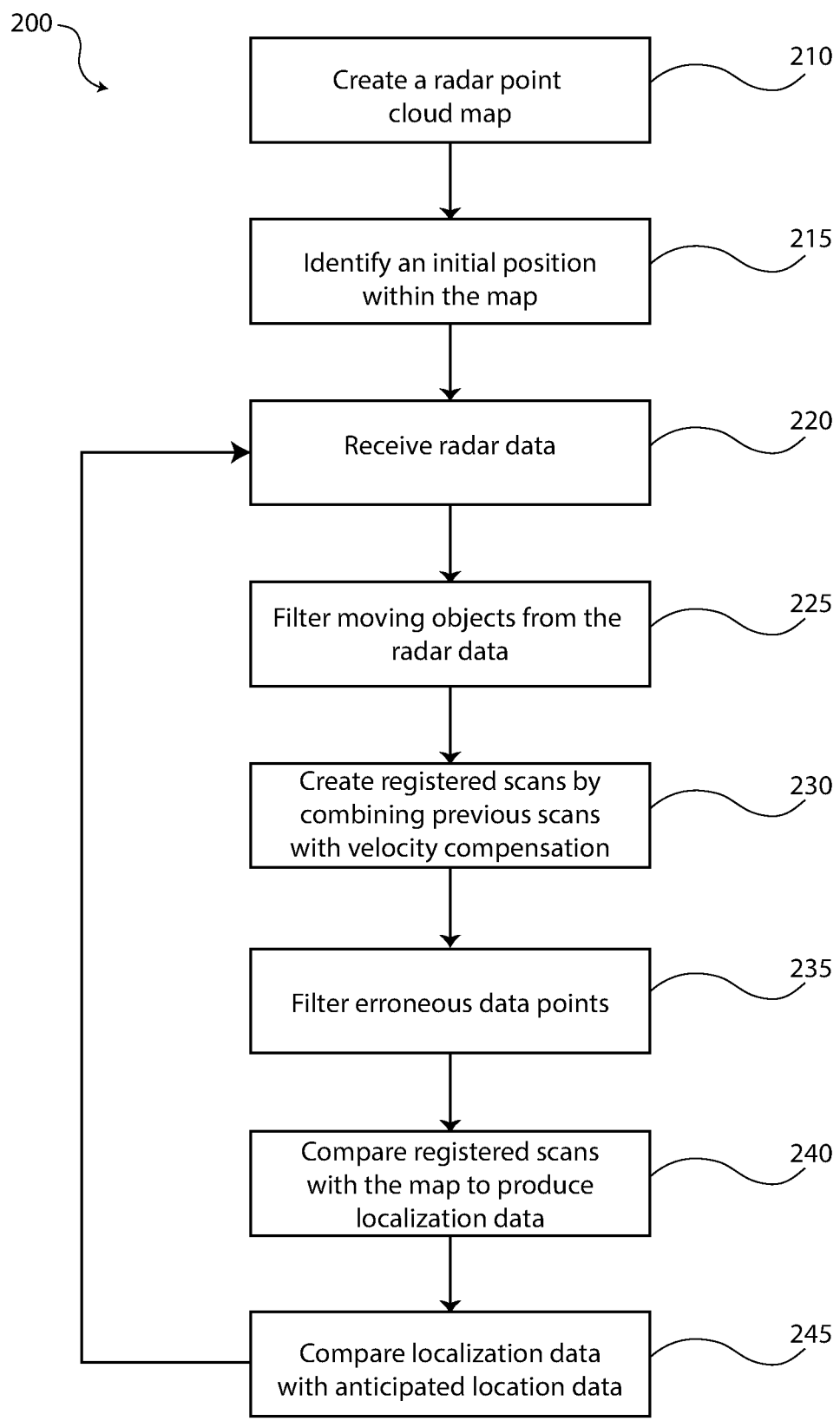
FIG. 2 is an example flowchart of a process for localizing an autonomous vehicle.

FIG. 2 is an example flowchart of a process 200 for localizing an autonomous vehicle. The blocks in process 200 may occur in any order; and of the blocks may be removed or deleted; and additional blocks may be added. The process 200 may be executed, for example, by computational system 400 and/or controller 150. The process 200, for example, may be executed at an autonomous vehicle (e.g., autonomous vehicle 110) and/or in the cloud (e.g., base station 174).

At block 210 a map may be created using a mapping algorithm (e.g., mapping algorithm 315). The map may be created, for example, by manually moving one or more radar sensors in the environment. The radar data may be collected and a map can be created. The map, for example, may be a point cloud map. A point cloud map, for example, may include a listing of points that indicate a distance relative to an origin point within a plane. Each listing of points may relate to an object within the environment. Each listing of points may include cartesian data points measured from an origin and/or a probability measure that indicates the probability that an object exists.

A map can be created, for example, by concatenation of radar scans into a point cloud using GPS and/or SLAM-techniques for registering multiple scans together. The radar data may, for example, be tracked over time to reduce duplicate points. The radar data, for example, may be filtered to reduce the number of points.

As another example, a map can be created by creating an occupancy grid with one or more inverse sensor models using GPS and/or SLAM techniques. The occupancy grid may be realized or saved to a computer in either a grid-like fashion or as a point cloud representing occupied cells. The inverse sensor model may be trained using a variety of techniques include least-squares estimation, machine learning, deep learning, or heuristic tuning, etc.

As another example, the map may be stored in memory as a K-D tree structure.

At block 215, an initial position may be identified. For example, a position reset can take place. This may, for example, occur at any time during operation and may result from user input or a global or semi-global search algorithm. Alternatively, the initial position may occur at the beginning of an operation, day or shift when the autonomous vehicle starts in a known position. The known position may allow the process 200 to determine future positions within the map.

At block 220, a radar scan may be received. The radar, for example, may scan the environment and provide radar scan data many times a minute such as, for example, at 10 Hz, 15 Hz, 20 Hz, etc. The radar data may include a range, angle, and/or velocity data (e.g., doppler data) for each detected point. The range and/or angle data may be measured relative to the sensor and/or a direction of the sensor.

At block 225, data points related to moving objects may be filtered from the radar data. Block 225, for example, may be executed by the mapping algorithm 315 and/or the radar registration algorithm 335. The data points with a velocity measurement greater than a threshold value, for example, may be removed from the radar scan. The threshold value may take into account the velocity and bearing of the autonomous vehicle. The sensor velocity, for example, may be estimated using a least-squares method with outlier rejection such as, for example inter-quantile range, seeding with wheel speed, etc. This recovered radar velocity can be forwarded to one or more state estimators.

At block 230, for each radar scan, registered scans may be created. Block 230, for example, may be executed by a radar registration algorithm 335. A registered scan may be created by combining a plurality of previous scans with the radar scan. The plurality of previous scans may include a set number of scans (e.g., 10, 15, 20, or 50) or scans over a previous period of time (e.g., 1, 2, 5, 10 seconds). The points for these scans may be adjusted for combining based on the vehicle speed and/or bearing of the autonomous vehicle. The vehicle speed and/or bearing may be determined or input based on the speed and/or bearing of the previous scan, input from wheel speed, input from a inertial measurement unit, etc.

The autonomous vehicle speed and/or bearing, for example, could be computed using a Kalman filter or any variant of a Kalman filter, or a particle filter or any variants of a particle filter.

At block 235, erroneous radar points can be removed from the registered radar scan. Block 235, for example, may be executed by the mapping algorithm 315 and/or radar registration algorithm 335. The erroneous radar points can be removed, for example, using point-density, point attributes (e.g., low radar cross-section), or other relevant information. At block 235, for example, a point relevance factor can be computed from local point geometric structure. For example, features in the point cloud that may represent more important information may be used for localization. If there are other sensors on the autonomous vehicle that can detect objects (e.g. a camera), process 200, for example, can correlate the radar data with other sensors' objects and remove the objects.

At block 240, the registered radar scan may be matched with the map. The registered radar scans, for example, may be matched with the map by the radar registration algorithm 335. The registered radar scans may be matched with the map, for example, using an iterative closest point algorithm, a cross-correlation algorithm, a perfect match algorithm, etc. to determine location data. The location data may include a location within the map such as, for example, with respect to the map origin and/or latitude, longitude, and/or altitude information. The location data may include velocity data and/or bearing data, which may be calculated from the estimate location and previous location data. The localization data, for example, may be matched using a global search algorithm. The registered radar scan, for example, may be matched with the map using a global search algorithm.

At block 245, the location data, for example, may be compared with state estimates, which may include estimated location data and/or estimated velocity data. The comparison, for example, may be executed by the state estimation algorithm 360. The state estimates may include an estimated location based on the previous velocity data, previous location data, inertial measurement unit data, wheel speed data, camera data, ground speed radar data, etc. The state estimates may be estimated using an estimator that may include a Kalman filter (e.g., an Extended Kalman Filter or Unscented Kalman Filter), a particle filter, or any variant thereof, etc.

The state estimates may be updated with the localization data. This may include taking the available inputs which may include one or more of position data recovered from the radar algorithm, velocity data recovered from the radar algorithm, inertial measurement unit data, wheel speed data, camera data, ground speed radar data, etc.

For example, a radar driver may communicate with the radar unit such as, for example, a radar part of sensor array 179 and/or may input the radar data such as, for example, as described in block 220. A pulsar stitcher algorithm, for example, may stitch together radar data with previous radar data such as, for example, as described in block 230. A matcher algorithm, for example, may match radar data with map data such as, for example, as described in block 240. A pose logger algorithm may input the previous location and/or velocity data that may, for example, be used in block 230 and/or block 240.

Figure 3:
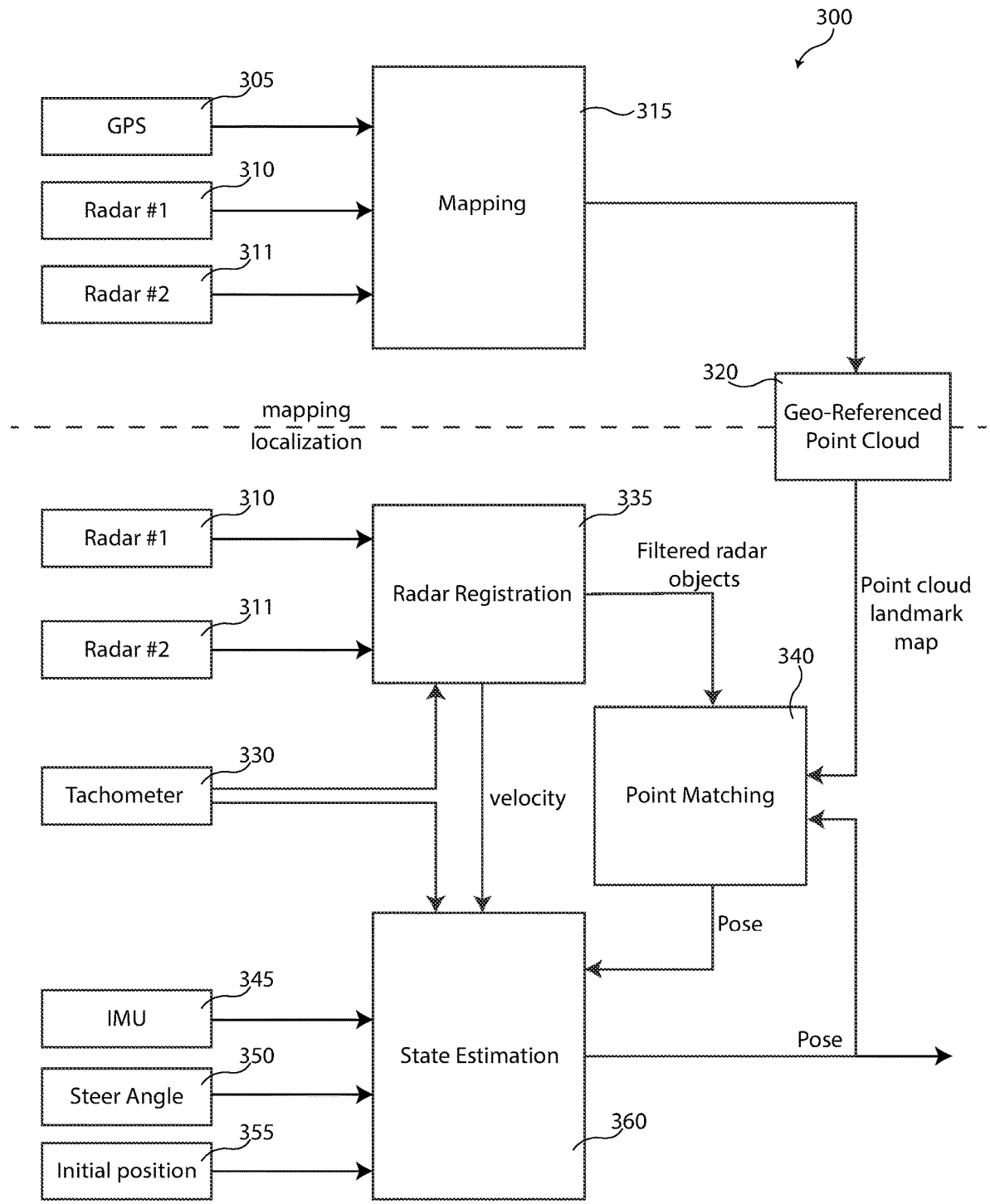
FIG. 3 is an example block diagram of an autonomous vehicle system.

FIG. 3 is an example block diagram of a mapping and localization system 300. The mapping and localization system 300, for example, may include a mapping process and localization process. The mapping and localization system 300 may include a mapping algorithm 315 that produces a geo-reference point cloud map 320 using inputs from GPS 305, a first radar 310, and/or a second radar 311. The geo-reference point cloud map 320 may be stored in digital memory (e.g., memory device 156 and/or storage devices 425). The mapping algorithm 315 may be executed on the controller 150.

For example, the mapping algorithm 315 may concatenate points received from the GPS 305, the first radar 310, and/or the second radar 311 into a map frame. The mapping algorithm 315, for example, may also filter outlier data received from the GPS 305, the first radar 310, and/or the second radar 311. The mapping algorithm 315, for example, may also track landmarks on the map. These landmarks may include fixed items on the map, which may also aid in localization. These landmarks may be represented as a point cloud or as cells in an occupancy grid.

The mapping algorithm 315, for example, may also reject non-stationary objects. For example, the data points with a velocity measurement greater than a threshold value, for example, may be removed from the radar scan. The threshold value may take into account the velocity and bearing of the autonomous vehicle. The sensor velocity, for example, may be estimated using a least-squares method with outlier rejection such as, for example inter-quantile range, seeding with wheel speed, etc. This recovered radar velocity can be forwarded to one or more state estimators.

The mapping algorithm 315 may perform functions similar to block 210 of process 200.

As part of the localization process, the mapping and localization system 300 may include a radar registration algorithm 335 that receives radar data from the first radar 310 and the second radar 311 (or any number of radars). The radar registration algorithm 335, for example, may also receive speed data from a tachometer 345. The radar registration algorithm 335, for example, may produce filtered radar object data and/or autonomous vehicle velocity data. The radar registration algorithm 335 may be executed on controller 150.

The radar registration algorithm 335, for example, may fuse together data from multiple radars to produce a single radar data set. The radar registration algorithm 335, for example, may use mounting position data and/or odometry data to fuse together data from multiple radars to produce a single radar data set. The radar registration algorithm 335, for example, may use odometer data such as, for example, using a bundle adjustment algorithm.

The radar registration algorithm 335, for example, may reject non-stationary objects such as, for example, as noted in block 225 of process 200.

The mapping and localization system 300 may also include a point matching algorithm 340. The point matching algorithm 340 may input the filtered radar object data from the radar registration algorithm 335 and the geo-reference point cloud map and output pose data. The point matching algorithm 340 may also receive pose data from a state estimation algorithm 360. Initial pose data, for example, may be generated by available GPS data (e.g. filtered through an extended Kalman filter) or set manually by the user via a user-interface by clicking on map. The point matching algorithm 340 may be executed on controller 150.

The mapping and localization system 300 may also include a state estimation algorithm 360. The state estimation algorithm 360, for example, may input velocity data from the radar registration algorithm 335, pose data from the point matching algorithm 340, speed data from the tachometer 330, inertial data from the inertial measurement unit (IMU) 345, steer angle data from the steering system 350, and/or an initial position data 355 to produce pose data (or localization data). The pose data may be fed into the point matching algorithm 340. The state estimation algorithm 360 may be executed on controller 150.

Figure 4:
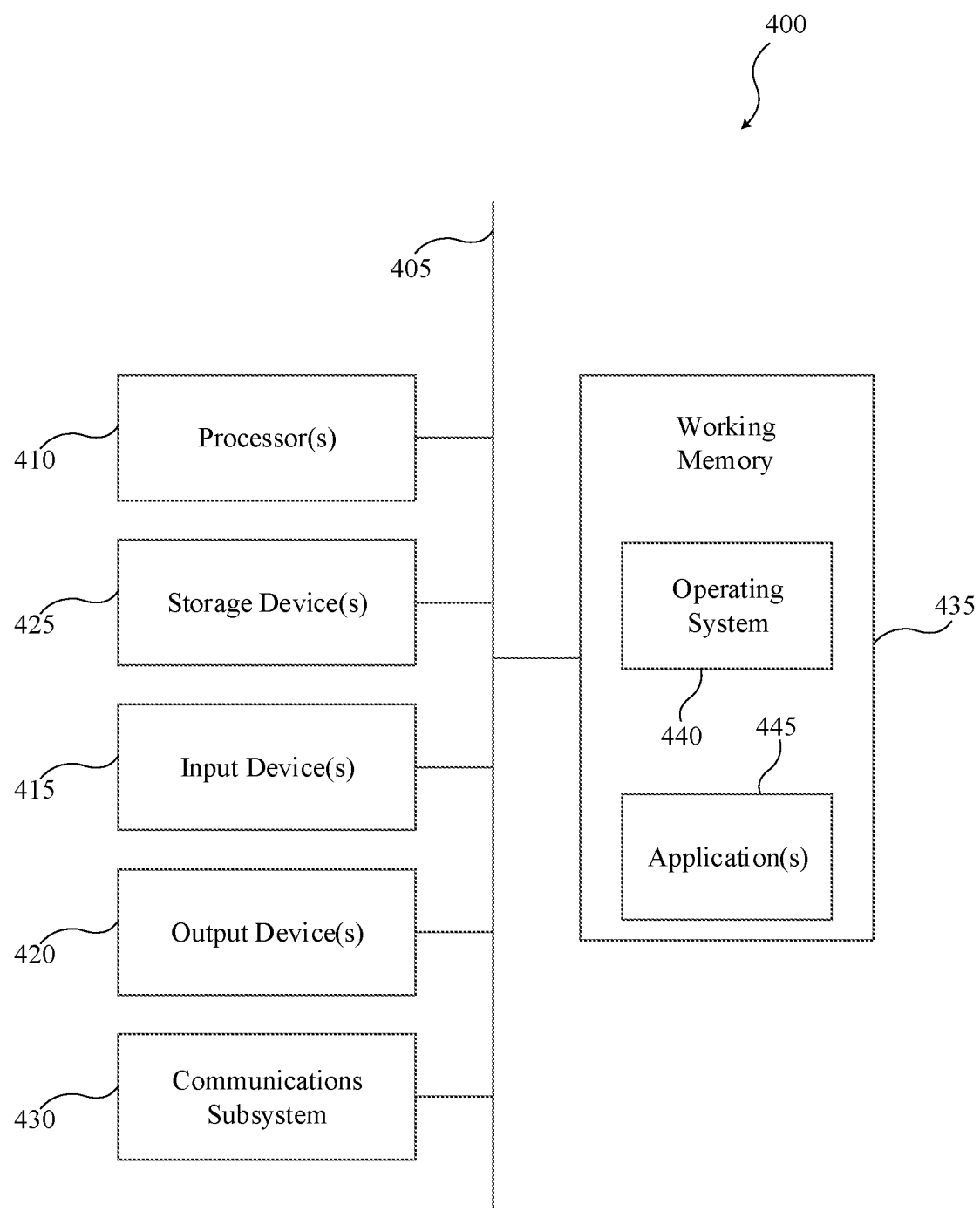
FIG. 4 is a block diagram of an example computational system (or controller).

The computational system 400, shown in FIG. 4 can be used to perform any of the examples disclosed in this document. For example, computational system 400 can be used to execute process 200. As another example, computational system 400 can perform any calculation, identification and/or determination described here. Computational system 400 includes hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computational system 400 may further include (and/or be in communication with) one or more storage devices 425, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 400 might also include a communications subsystem 430, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 430 may permit data to be exchanged with a network (such as the network described below, to name one example), and/or any other devices described in this document. The computational system 400, for example, may include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

The storage medium, for example, might be incorporated within the computational system 400 or in communication with the computational system 400. The storage medium might be separate from a computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.) then takes the form of executable code.

Although term "autonomous vehicle" includes manned vehicles, remote control vehicles, manual vehicles, etc.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more examples disclosed in this document. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific examples, those skilled in the art, upon attaining an understanding of these examples, may readily produce alterations to, variations of, and equivalents to such examples. Accordingly, the present disclosure has been presented for purposes of example rather than limitation, and does not preclude inclusion of such modifications, variations and/or additions to the present subject matter as would be readily apparent to one of ordinary skill in the art.

That which is claimed:

1. An autonomous vehicle comprising:
  a velocity sensor;
  a radar system;
  a digital storage medium; and
  a controller in communication with the digital storage medium, radar system, and the velocity sensor, the controller:
    retrieves map data from the digital storage medium;
    receives current radar data from the radar system;
    receives autonomous vehicle velocity data from the velocity sensor;
    identifies radar data points in the current radar data that represent objects in motion;
    removes radar data points from the current radar data that represent objects in motion; and
    matches the radar data with the map data to return location data.

2. The autonomous vehicle according to claim 1, wherein the controller combines the current radar data with previous radar data using the autonomous vehicle velocity data.

3. The autonomous vehicle according to claim 1, wherein the controller filters erroneous radar data from the combined radar data.

4. The autonomous vehicle according to claim 1, wherein the velocity sensor comprises one or more of an inertial measurement unit, a compass, a GPS sensor, a wheel encoder, a tachometer, and a camera.

5. The autonomous vehicle according to claim 1, further comprising a transceiver that receives map data from a base station.

6. The autonomous vehicle according to claim 1, wherein the map data includes a point cloud or an occupancy grid.

7. The autonomous vehicle according to claim 1, wherein the autonomous vehicle velocity data comprises acceleration data, inertial measurement unit data, wheel speed data, camera data, velocity data from a wheel encoder, and/or ground speed radar data.

8. The autonomous vehicle according to claim 1, wherein matching the radar data with the map data to return location data includes using any point cloud-matching or grid-matching algorithm, including iterative closest point, cross-correlation, and/or perfect match.

9. The autonomous vehicle according to claim 1, wherein matching the radar data with the map data to return location data includes performing a global search in the map data using the combined radar data.

10. A method comprising:
  receiving map data;
  receiving current radar data recorded with a radar system on an autonomous vehicle;
  receiving autonomous vehicle velocity data;
  identifying radar data points in the current radar data that represent objects in motion;
  removing radar data points from the current radar data that represent objects in motion;

matching the radar data with the map data to return location data.

11. The method according to claim 10, further comprising combining the current radar data with previous radar data using the autonomous vehicle velocity data.

12. The method according to claim 10, further comprising filtering erroneous radar data from the radar data.

13. The method according to claim 10, further comprising:
   estimating an estimated location of the autonomous vehicle based on previous radar data and vehicle velocity data; and
   comparing the location data with the previous estimated location.

14. The method according to claim 13, wherein estimating an estimated location of the autonomous vehicle based on previous radar data and vehicle velocity data comprises using a Kalman filter or a particle filter.

15. The method according to claim 10, wherein the map data includes a point cloud or an occupancy grid.

16. The method according to claim 10, wherein the autonomous vehicle velocity data comprises velocity data from a wheel encoder, acceleration data, inertial measurement unit data, wheel speed data, camera data, and/or ground speed radar data.

17. The method according to claim 10, wherein matching the radar data with the map data to return location data includes using a point cloud-matching, grid-matching algorithm, or scoring the radar data against an occupancy grid.

18. The method according to claim 10, wherein matching radar data with the map data to return location data includes performing a global search in the map data using the combined radar data.

19. A method comprising:
   receiving map data;
   receiving current radar data recorded with a radar system on an autonomous vehicle;
   receiving autonomous vehicle velocity data;
   identifying radar data points in the current radar data that represent objects in motion;
   removing radar data points from the current radar data that represent objects in motion;
   combining the current radar data with previous radar data using the autonomous vehicle velocity data to create combined radar data;
   filtering erroneous radar data from the combined radar data to create filtered and combined radar data; and
   matching the filtered and combined radar data with the map data to return location data.

* * * * *